United States Patent
Arai et al.

(10) Patent No.: US 8,081,637 B2
(45) Date of Patent: *Dec. 20, 2011

(54) NETWORK APPARATUS AND METHOD FOR FORWARDING PACKET

(75) Inventors: Masaya Arai, Atsugi (JP); Manabu Fujita, Yokohama (JP)

(73) Assignee: Alaxala Networks Corporation, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/717,371

(22) Filed: Mar. 4, 2010

(65) Prior Publication Data

US 2010/0158014 A1 Jun. 24, 2010

Related U.S. Application Data

(63) Continuation of application No. 11/487,347, filed on Jul. 17, 2006, now Pat. No. 7,715,407.

(30) Foreign Application Priority Data

Feb. 17, 2006 (JP) .................................. 2006-040644

(51) Int. Cl.
 *H04L 12/28* (2006.01)
 *H04L 12/56* (2006.01)
(52) U.S. Cl. .................................. 370/395.3; 370/395.5
(58) Field of Classification Search .................. None
 See application file for complete search history.

(56) References Cited

U.S. PATENT DOCUMENTS

| | | | | |
|---|---|---|---|---|
| 2005/0044262 A1* | 2/2005 | Luo | ............................. | 709/238 |
| 2006/0221974 A1* | 10/2006 | Hilla et al. | .................... | 370/394 |

FOREIGN PATENT DOCUMENTS

| | | |
|---|---|---|
| CN | 1405986 | 3/2003 |
| CN | 1725727 | 1/2006 |
| CN | 1725761 | 1/2006 |
| JP | 2003-218911 A | 7/2003 |

OTHER PUBLICATIONS

"TechFest Ethernet Technical Summary" pp. 1-5, Chpt. 3.
Link Aggregation according to IEEE 802.3ad, SysKonnect.
L Martini, et al. "Encapsulation Methods for Transport of Ethernet over MPLS Networks", pp. 1-24. Apr. 2006.
L. Martini, et al. Psuedowire Setup and Maintenance Using the Label Distribution Protocol (LDP). pp. 1-33. Apr. 2006.
Martini, L. et al., "Psuedowire Setup and Maintenance Using the Label Distribution Protocol (LDP)", Apr. 2006, p. 1-33.
"SysKonnect solution for LinkAggregation with Gigabit Ethernet", SysKonnect, IEEE 802.3ad, Apr. 4, 2002, 9 pages.
Selection of Network Devices over Next Five Years, proposed by Huawei-3Com Technology Co., Ltd., ASCII Medica Works Inc., Network Magazine, May 2005, pp. 28-31.
Y. Nasuno et al., Bundled Links Enable Broader Bandwidth, Nikkei Byte, Nikkei Business Publications, Inc., Aug. 2003, pp. 106-111.
Japanese Office Action, dated Jun. 15, 2010.

* cited by examiner

*Primary Examiner* — Ayaz Sheikh
*Assistant Examiner* — Blanche Wong
(74) *Attorney, Agent, or Firm* — Mattingly & Malur, PC

(57) ABSTRACT

When a network apparatus of this invention receives an IEEE 802.3ad link application control packet from a subscriber line with a VPWS function, it processes the packet in a control unit without relaying the packet by VPWS. More specifically, the network apparatus receives an IEEE802.3ad link aggregation control packet along with receiving an IEEE802.3x flow control packet. The network apparatus transmits a link aggregation control packet. The network apparatus also relays other layer 2 control protocol packets without receiving them, and does not transmit the other layer 2 control protocol packets.

11 Claims, 3 Drawing Sheets

```
1 : interface ethernet 1
2 :     l2transport
3 : interface ethernet 2
4 :     l2transport
5 : link-aggregation 10
6 :     aggregated-port 1-2
7 : mpls
8 :     l2transport link-aggregation 10 vcid 20
9 :         targeted-peer 100-2
```

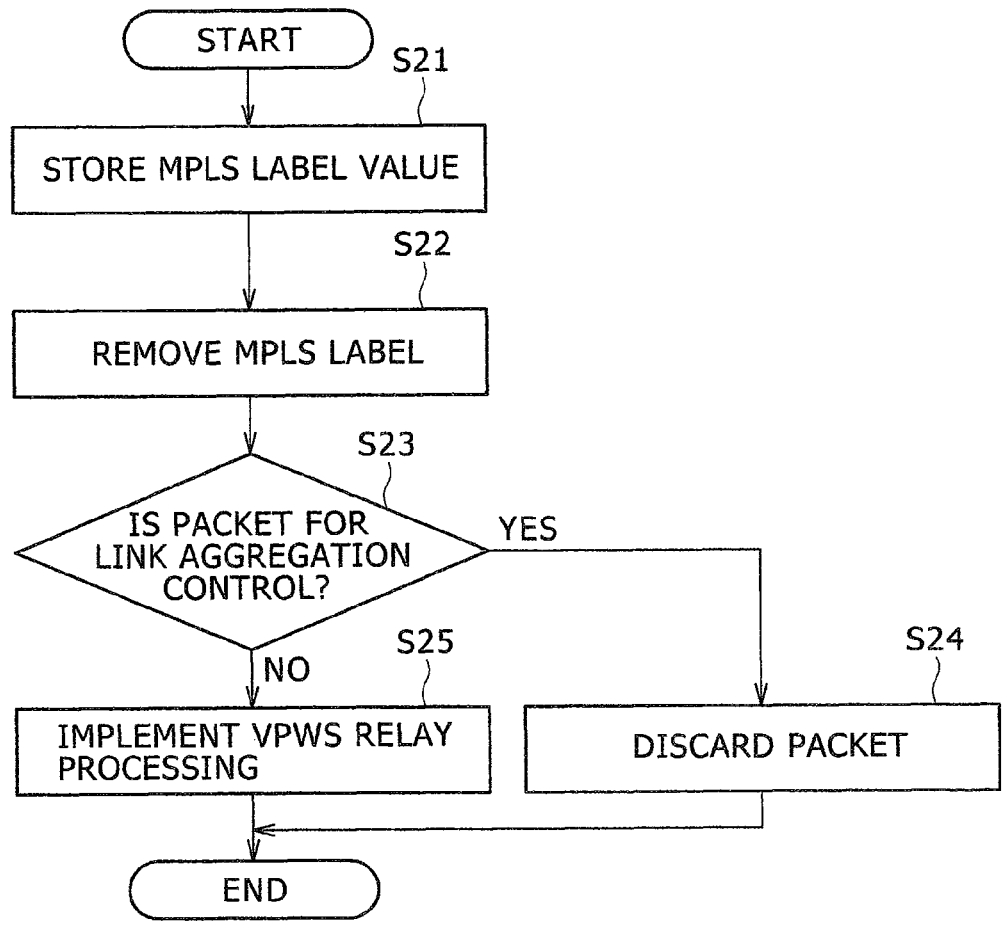

NETWORK APPARATUS AND METHOD FOR FORWARDING PACKET

CROSS-REFERENCES

This is a continuation application of U.S. Ser. No. 11/487,347, filed Jul. 17, 2006 (now U.S. Pat. No. 7,715,407), the entire disclosure of which is hereby incorporated by reference.

CLAIM OF PRIORITY

The present application claims priority from Japanese patent application serial no. 2006-040644, filed on Feb. 17, 2006, the content of which is hereby incorporated by reference into this application.

BACKGROUND OF THE INVENTION

This invention relates to a network apparatus and method for forwarding a packet, and relates to a network apparatus and method for forwarding a packet for providing layer 2 VPN functions.

The VPWS (Virtual Private Wire Service) function using MPLS (Multi Protocol Label Switching) switching is one method for constructing a Layer 2 Virtual Private Network. In VPWS operation, the network apparatus functioning via Ethernet on subscriber lines receives only flow control packets defined by IEEE 802.3x, and relays all other packets. In other words, in VPWS operation the network apparatus provides layer 2 VPN service by relaying all packets other than flow control packets.

Ethernet line redundancy on the other hand is regulated by IEEE 802.3ad standard. This standard achieves line redundancy by transmitting and receiving link aggregation control packets.

The following Document 1 (in particular, 3.2.1 "PAUSE Frames") is described in the IEEE 802.3x standard. The subsequent Document 2 is described in the IEEE 802.3ad standard. The subsequent Document 3 and Document 4 are described in the RFC (Request For Comments) of the IETF (Internet Engineering Task Force) relating to VPWS.

VPWS, as might be assumed from the title of wire service, is a service lending cable lines to carriers. VPWS therefore gives no consideration to link aggregation.

Document 1: "TechFest Ethernet Technical Summary", the Internet<http://www.techfest.com/networking/lan/ethernet.htm>

Document 2: "Link Aggregation according to IEEE 802.3ad", the Internet<http://www.triumf.ca/canarie/amsterdam-test/References/wp-lag-c.pdf>

Document 3: L. Martini, and three others, "Pseudowire Setup and Maintenance using the Label Distribution Protocol", the Internet<URL:http//www.ietf.org/rfc/rfc4447.txt>

Document 4: L. Martini, and three others, "Encapsulation Methods for Transport of Ethernet Over MPLS Networks", the Internet<URL:http//www.ietf.org/rfc/rfc4448.txt>

SUMMARY OF THE INVENTION

As described above, attempting to apply IEEE 802.3ad link aggregations to subscriber Ethernet lines adapted to VPWS causes the link aggregation control packets to be relayed. Applying a link aggregation between two customer edge apparatuses via an MPLS network is possible. However, link aggregations cannot be applied to subscriber lines between customer edge apparatuses and provider edge apparatuses.

The object of this invention is to provide a high-reliability network device for VPWS subscribers on Ethernet lines with redundancy capability and capable of seamless band additions.

The network apparatus of this invention receives an IEEE802.3ad link aggregation control packet and also receives an IEEE802.3x flow control packet. The network apparatus transmits link aggregation control packets. The network apparatus also relays other layer 2 control protocol packets without receiving them, and does not transmit other layer 2 control protocol packets.

A network apparatus connecting an MPLS network and a subscriber line for providing layer 2 VPN between the MPLS network and the subscriber line, is characterized in that the subscriber line forms a link aggregate with other subscriber lines.

A network apparatus connecting an MPLS network and a subscriber line for providing layer 2 VPN between the MPLS network and the subscriber line, is characterized in executing a flow control process when a flow control packet is received from the subscriber line, and executing a link aggregate process or withdraw process with other subscriber lines when a link aggregation control packet is received from the subscriber line.

A network apparatus connecting an MPLS network and a subscriber line for providing layer 2 VPN between the MPLS network and the subscriber line, is characterized in discarding a link aggregation control packet when the link aggregation control packet attached with a label is received from the MPLS network.

BRIEF DESCRIPTION OF THE DRAWINGS

Preferred embodiments of the present invention will now be described in conjunction with the accompanying drawings, in which:

FIG. 5 is a flowchart for describing the process when the provider edge apparatus receives a packet from another provider edge apparatus; and FIG. 6 is a drawing showing the table held by the provider edge apparatus.

DESCRIPTION OF THE PREFERRED EMBODIMENTS

Figure 1:
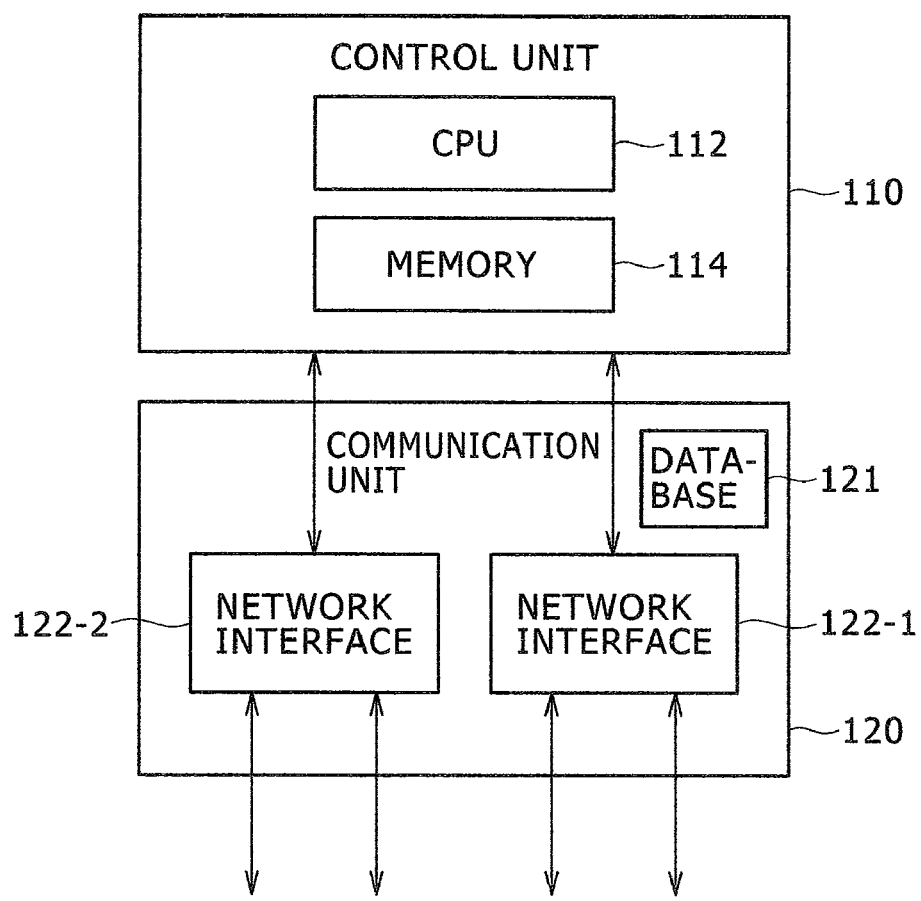
FIG. 1 is a block diagram showing the structure of the network apparatus.
Figure 2:
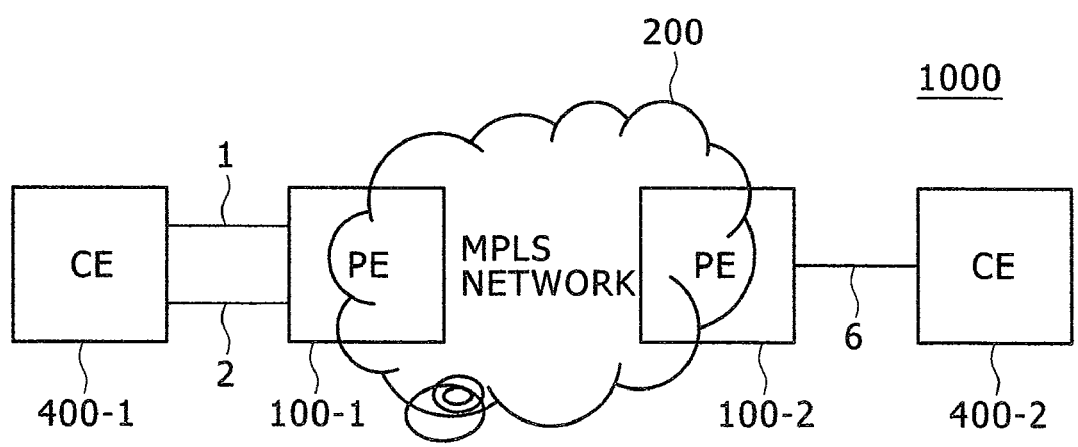
FIG. 2 is a block diagram of the network.
Figures 3, 4:
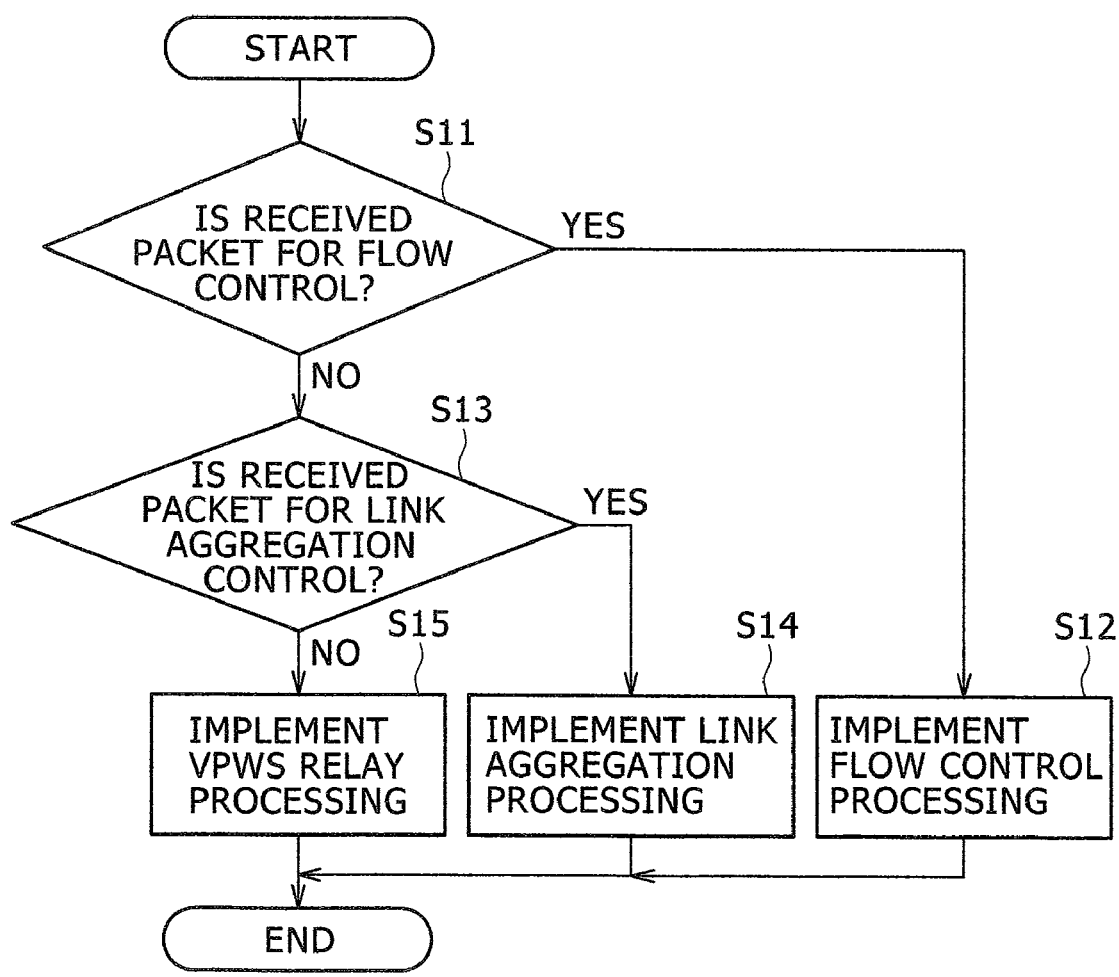
FIG. 3 is a drawing for describing the structural information of the provider edge apparatus.
FIG. 4 is a flowchart for describing the process when the provider edge apparatus receives a packet from the customer edge apparatus.

The embodiment of this invention is hereafter described while referring to the drawings in FIG. 1 through FIG. 6. Here, FIG. 1 is a block diagram showing the structure of the network apparatus. FIG. 2 is a block diagram of the network. FIG. 3 is a drawing for describing structural information on the provider edge apparatus. FIG. 4 is a flowchart for describing the process when the provider edge apparatus receives a packet from the customer edge apparatus. FIG. 5 is a flowchart for describing the process when the provider edge apparatus receives a packet from another provider edge apparatus. FIG. 6 is a drawing showing the table held by the provider edge apparatus.

A network apparatus 100 includes a control unit 110 and a communication unit 120 as shown in FIG. 1. This control unit 110 contains a memory 114 and a CPU 112. The CPU 112 processes control packets and controls the entire device by executing programs stored within the memory 114. The communication unit 120 contains two network interfaces 122 and relays packets between a third layer (network layer) and a second layer (data link layer) of an OSI (Open Systems Interconnection) reference model. The communication unit 120 also relays packets on the MPLS layer. Each network interface 122 is connected to a respective line (twisted pair cable, optical fiber, etc.) such as the Ethernet.

The network where the network apparatus is utilized, is described while referring to FIG. 2. A network 1000 in FIG. 2 is made up of a customer edge apparatus (shown in the figure as CE: Customer Edge) 400-1, and a provider edge apparatus (shown in the figure as PE: Provider Edge) 100-1, a provider edge apparatus 100-2, and a customer edge apparatus 400-2. The provider edge apparatus 100-1 and the customer edge apparatus 400-1 are connected via lined 1 and 2. The lines 1 and 2 of the provider edge apparatus 100-1 and the customer edge apparatus 400-1 are concentrated by a link aggregation defined in IEEE 802.3ad. The provider edge apparatus 100-2 and the customer edge apparatus 400-2 however are connected by a line 6. In other words, there is no link aggregation between the provider edge apparatus 100-2 and the customer edge apparatus 400-2.

The provider edge apparatus and the customer edge apparatus are both network apparatuses. The customer edge apparatus may utilize the structure in FIG. 1.

The configuration information of FIG. 3 is placed in the memory 114 of FIG. 1. The first line of FIG. 3 specifies the Ethernet network interface to which the Ethernet line 1 is connected. The second line specifies the network interface shown in line 1 as a layer 2 VPN subscriber line. The third line specifies the Ethernet network interface to which the Ethernet line 2 is connected. The fourth line specifies that the network interface shown in the third line is a layer 2 VPN subscriber line. The fifth line specifies the IEEE 802.3ad link aggregation and specifies the control ID as 10. The sixth line specifies the interfaces defined in the first and third lines as network interfaces belonging to the IEEE 802.3ad link aggregation specified in the fifth line. The seventh line and onward define structural information for the MPLS function. The eighth line specifies layer 2 VPN. The IEEE 802.3ad link aggregation defined in the fifth and sixth line is specified for the layer 2 VPN subscriber line, and the control ID is defined as 20. The ninth line specifies the provider edge apparatus 100-2 as the exit edge router for this layer 2 VPN. Based on these structures, the provider edge apparatus 100-1 establishes an IEEE 802.3ad link aggregation with the customer edge apparatus 400-1 and establishes the VC required for 2 layer VPN with the provider edge apparatus 100-2.

FIG. 4 is a flowchart of the process when the provider edge apparatus 100-1 has received a packet from the customer edge apparatus 400-1. The provider edge apparatus 100-1 first of all decides whether the received packet is for flow control as specified in IEEE 802.3x (S11). If the decision is "YES" then the flow control process is executed (S12).

If the decision in step 11 is "NO", then a decision is made whether the received packet is for link aggregation as specified in IEEE 802.3ad (S13). If the decision is "YES", then the control unit 110 executes the link aggregation process, and controls the aggregation and withdraw recovery of the line 1 and the line 2 (S14). If the decision in step 13 is "NO" then the provider edge apparatus 100-1 relays the packet to the VPWS (S15) and the process ends.

FIG. 5 is a flowchart for the processing when the provider edge apparatus 100-1 has received a packet from the provider edge apparatus 100-2. The provider edge apparatus 100-1 stores the MPLS label value attached to the received packet (S21). The provider edge apparatus 100-1 next removes the MPLS label from the received packet (S22). This step 22 is required because the provider edge apparatus 100-2 encapsulates the packet sent from the customer edge apparatus 400-2 by utilizing the MPLS label. In order to implement layer 2 VPN, the MPLS label must be removed before the provider edge apparatus 100-1 sends (the packet) to the customer edge apparatus 400-1. The provider edge apparatus 100-1 next decides whether the packet whose MPLS label is removed is a link aggregation control packet as specified in IEEE 802.3ad (S23). If the decision is "YES", then that received packet is discarded (S24). If the decision in step 23 is "NO", then the VPWS relay process is executed (S25) and the process ends.

The necessity for step 24 (discarding the link aggregation control packet) is described here. If the provider edge apparatus 100-2 carries out the processing shown in step S14 in the sequence of FIG. 4 when a link aggregation control packet is sent from the customer edge apparatus 400-2, then the provider edge apparatus 100-2 processes the packet so that packet is not sent to the provider edge apparatus 100-1. On the other hand, when the processing shown in step S14 in FIG. 4 is not performed, then the provider edge apparatus 100-2 sends a link aggregation control packet from the customer edge apparatus 400-2, and this packet reaches the provider edge apparatus 100-1 via the provider edge apparatus 100-2. The link aggregation control packet sent from the customer edge apparatus 400-2 does not arrive at the customer edge apparatus 400-1 since the provider edge apparatus 100-1 carries out the processing in step S24. This step S24 as related previously is a step required for making link aggregation function correctly on the line 1 and the line 2 connecting the customer edge apparatus 400-1 and the provider edge apparatus 100-1.

FIG. 6 is an output line select table used when selecting an output line on which to send a packet to the customer edge apparatus 400-1 when the provider edge apparatus 100-1 has received a packet from the provider edge apparatus 100-2. The output line select table 60 is stored in the database 121 of the communication unit 120 of the provider edge apparatus 100. The output line select table 60 contains an input label value 61 and an output interface type 62 and output line 63 and output line selection method 64.

The provider edge apparatus 100-1 must identify the output network interface for sending the received packet, from the MPLS label value that is stored in step S21 of FIG. 5. If the input label value attached to the packet received by the provider edge apparatus 100-1 is "16", then the provider edge apparatus 100-1 refers to the output line select table 60, and sets the network interface for outputting the packet is a link aggregation where line 1 and line 2 are concentrated. One of either the first line or the second line is then assumed to be selected as the output line. However the selection method used here is random so that either the first line or the second line is selected at random and the packet is then sent.

However, if the input label value attached to the packet received by the provider edge apparatus 100-1 is "18", then the provider edge apparatus 100-1 refers to the output line select table 60, and sets the network interface for outputting the packet as a link aggregation where line 4 (not shown in FIG. 1) and line 5 (not shown in drawing) are concentrated as a link aggregation. Here, the selection method selects the output line via the L2 header so after analyzing the packet L2 header in a state where the MPLS label was removed from the received packet, one output line is selected from line 4 or a line 5 based on predetermined rules, and that packet is then sent.

Further, if the input label value attached to the packet received by the provider edge apparatus 100-1 is "17", then the provider edge apparatus 100-1 refers to the output line select table 60, and sends the packet on the line 3 (not shown in FIG. 1) as the network interface for output where there is no link aggregation.

The reason for using 16 through 18 as input label values is that these values can be used freely. These values are defined along with the presence or absence of a link aggregation, and the output line selection method using FIG. 6. Therefore other values or combinations of values may also be used.

In the above embodiment, the link aggregation is implemented by the provider edge apparatus 100-1 and the customer edge apparatus 400-1 mutually sending and receiving link aggregation control packets. However, this embodiment is not limited to this means, and rather than sending and receiving link aggregation control packets, lines may be concentrated or withdrawn by utilizing structural information by applying a so-called static mode.

The above embodiment utilized MPLS as the method for implementing layer 2 VPN, however this method may also be applied when functions such as VLAN are used and the invention is not limited to these methods.

The layer 2 VPN device of this embodiment applied link aggregation to the subscriber lines so that there was no stoppage of subscriber communication even if a problem occurred on one of the lines in the line concentration at the link aggregation. Moreover, even if there is insufficient bandwidth for a line, the effect on communications can be eliminated, and bandwidth can be easily increased by adding lines concentrated by the link aggregation. Moreover seamless increases to the band (width) can be made.

What is claimed is:

1. A provider edge apparatus which is connected to a customer edge apparatus via a subscriber line and to an MPLS network for providing a layer 2 virtual private network (VPN) for a subscriber, said provider edge apparatus comprising:
   a communication unit which relays packets received from the subscriber line and the MPLS network; and
   a control unit which processes a control packet received by the communication unit,
   wherein said control unit implements a flow control process when said control unit receives a flow control packet from said customer edge apparatus via said subscriber line,
   wherein said control unit implements a link aggregation process with said subscriber line and the other subscriber line which is connected to said customer edge apparatus when said control unit receives a link aggregation control packet from said customer edge apparatus via said subscriber line, and
   wherein said link aggregation control packet is an IEEE 802.3ad link aggregation control packet.

2. The provider edge apparatus according to claim 1, wherein said flow control packet is an IEEE 802.3x PAUSE Frame.

3. The provider edge apparatus according to claim 1, wherein said layer 2 Virtual Private Network is implemented by virtual private wire service.

4. The provider edge apparatus according to claim 1, wherein said control unit relays a received packet when said control unit receives a packet other than said flow control packet and said link aggregation control packet from said customer edge apparatus via the subscriber line.

5. The provider edge apparatus according to claim 1, wherein said communication unit selects one output interface from one or a plurality of link aggregation groups based on an MPLS label which is labeled to a received packet from the MPLS network and transmits the received packet to the selected output interface.

6. The provider edge apparatus according to claim 1, wherein said communication unit selects one subscriber line from a link aggregated plurality of subscriber lines based on an MPLS label which is labeled to a received packet from the MPLS network and transmits the received packet to the selected subscriber line.

7. A provider edge apparatus which is connected to a customer edge apparatus via a subscriber line and to an MPLS network for providing a layer 2 virtual private network (VPN) for a subscriber, said provider edge apparatus comprising:
   a communication unit which relays packets received from the subscriber line and the MPLS network; and
   a control unit which processes a control packet received by the communication unit,
   wherein said communication unit discards a link aggregation control packet when said communication unit receives the link aggregation control packet with an MPLS label from the MPLS network, and
   wherein said link aggregation control packet is an IEEE 802.3ad link aggregation control packet.

8. The provider edge apparatus according to claim 7, wherein said layer 2 Virtual Private Network is implemented by a virtual private wire service.

9. The provider edge apparatus according to claim 7, wherein said communication unit selects one subscriber line from link aggregated a plurality of subscriber lines based on an MPLS label which is labeled to a received packet from the MPLS network and transmits the received packet to the selected subscriber line.

10. A method for forwarding a packet of a provider edge apparatus which is connected to a customer edge apparatus via a subscriber line and to an MPLS network for providing a layer 2 virtual private network (VPN) for a subscriber, said method comprising the step of:
    receiving a packet from the customer edge apparatus via the subscriber line;
    deciding whether the received packet is a flow control packet or a link aggregation control packet;
    implementing a flow control process when the received packet is the flow control packet; and
    implementing a link aggregation process when the received packet is the link aggregation control packet,
    wherein said link aggregation control packet is an IEEE 802.3ad link aggregation control packet.

11. A method for forwarding a packet of a provider edge apparatus which is connected to a customer edge apparatus via a subscriber line and is connected to an MPLS network for providing a layer 2 virtual private network (VPN) for a subscriber, said method comprising the step of:
    receiving a packet with a MPLS label from the MPLS network;
    removing the MPLS label from the received packet;
    deciding whether the MPLS label removed packet is a link aggregation control packet; and
    discarding the MPLS label removed packet when the MPLS label removed packet is the link aggregation control packet,
    wherein said link aggregation control packet is an IEEE 802.3ad link aggregation control packet.

* * * * *